Nov. 6, 1934.   L. J. THOMPSON   1,979,356
SEAL
Filed July 17, 1933
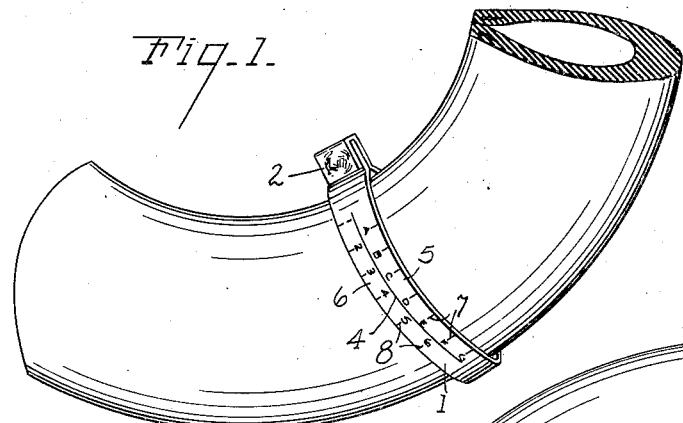
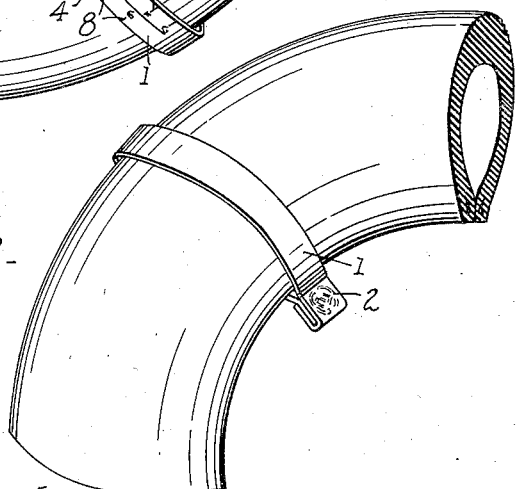
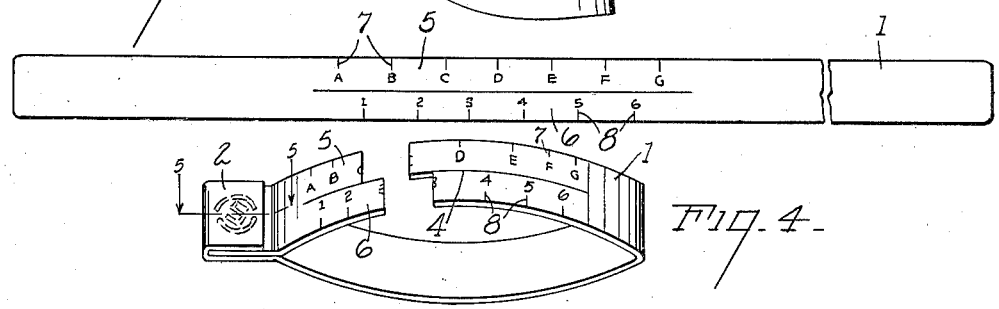
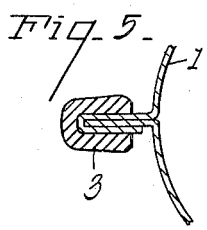
INVENTOR
Leroy J. Thompson
BY
ATTORNEYS Patented Nov. 6, 1934

1,979,356

UNITED STATES PATENT OFFICE 1,979,356

SEAL

Leroy J. Thompson, Grand Rapids, Mich.

Application July 17, 1933, Serial No. 680,778

6 Claims. (Cl. 40—21)

At the present time it is customary for chain organizations to sell tires or the like with a guarantee of service for a certain length of time. Heretofore it has been customary for the employee making the sale to send in an application for a guarantee extending for the requisite period of time from the sale. This system has proven very unsatisfactory because in many instances dishonest employees will not send in the notice of the sale immediately, but will hold it over for several months before sending it in, thus leading the organization into giving a guarantee dating for the specified period from several months after the actual date of sale. This has led to considerable loss and my invention is to eliminate this loss. It has for its objects:

First, to provide a seal or like device that can be placed around the body of a tire or a portion of any article desired to prevent use of that article until the seal has been removed.

Second, to provide such a device with simple means for indicating the date at which the device is removed.

Third, to provide such a device that cannot be successfully tampered with.

Other objects and advantages pertaining to details and economies of construction and operation will appear from the description to follow. A preferred embodiment of my invention is illustrated in the accompanying drawing, in which:

Fig. 1 is a view of a section of automobile tire with one of my devices therearound.

Fig. 2 is a view of a section of tire with one of my devices therearound showing another view thereof.

Fig. 3 is a view showing my device before application to a tire.

Fig. 4 is a view of my device showing how it can be removed from a tire to record the date of selling.

Fig. 5 is a view of a type of seal different from that used in Figs. 1 to 4.

My device consists of a band or strap 1 that may be of metal or any suitable substance. It is of a length to encircle a body of a tire as shown in Figs. 1 and 2 and the ends may be sealed together as shown at 2. In Figs. 1–4 I show the ends merely crimped over and stamped with a seal which cannot be undone and then replaced without leaving evidence thereof. This is a very desirable and economical way of sealing the ends of the strap, but I do not want to be confined to any specific type of seal and have shown in Fig. 5 a seal 3 which is a typical lead seal that can be applied to hold the ends together. These seals are shown as illustrative and other forms of seals could be used to good advantage.

It is desirable to have the ends of the strap 1 such that they can be crimped if it is desired. A slit 4 extends longitudinally of the strap for a distance, dividing it into two portions 5 and 6. These portions extend parallel to one another and are of such nature that they function independently to maintain the strap around the body of the tire, that is, either portion may be cut through alone without making it possible to remove the strap. On each of these portions 5 and 6, I arrange a series of indicia 7, 8. I have shown these indicia in Fig. 3 as letters of the alphabet and as figures, although it will be understood that any indicia could be used satisfactorily and in any convenient number.

In use, my device is sealed around the body of the tire, as shown in Figs. 1 and 2, and when it is desired to remove the strap, the portions 5 and 6 may be cut at any desired point, at one of the indicia. The headquarters sends out every month or every period in which it is necessary, an indication as to where, or at what indicia on these portions, the straps are to be cut in removing the device for tires to be sold and guaranteed for the next following period. When the severed strap is sent in to headquarters, a guarantee is then issued in exact accordance with the indication given as to the time of the removal of the device.

In Fig. 4, the band has been cut at C and at 3, which might indicate any given time. It will be understood that it is also possible to eliminate indicia entirely and merely to indicate that the strap is to be cut at a certain distance from the end of the slit or from any given point on the strap.

It will be readily understood that many modifications of my invention can be utilized and I do not wish to be limited to the specific form shown.

Having thus described my invention, what I claim as new and desire to secure by Letters Patent is:

1. A device of the class described comprising a band adapted to encircle the body of a tire so that the tire cannot be used without removal of the band, said band having ends adapted to be sealed together by crimping and having a longitudinal cut dividing said band into two portions, and a series of indicia arranged in spaced relation on each of said portions, whereby the date at which the band is removed from the tire may be recorded by severing each of said portions at a predetermined one of the indicia thereon.

2. A device the class described comprising a band adapted to encircle the body of a tire so that the tire cannot be used without removal of the band, means for sealing the ends of said band, said band having a longitudinal cut dividing said band into two portions, and a series of indicia arranged in spaced relation on each of said portions, whereby the date at which the band is removed from the tire may be recorded by severing each of said portions at a predetermined one of the indicia thereon.

3. A seal comprising a band adapted to encircle the body of a tire so that the tire cannot be used without removal of the band, said band having ends adapted to be sealed together by crimping and having a longitudinal cut dividing said band into two portions, whereby the date at which the band is removed from the tire may be recorded by severing each of said portions at a predetermined point thereon.

4. A seal comprising a band adapted to encircle the body of a tire so that the tire cannot be used without removal of the band, means for sealing the ends of said band, said band having a longitudinal cut dividing said band into two portions, whereby the date at which the band is removed from the tire may be recorded by severing each of said portions at a predetermined point thereon.

5. A seal to prevent use of an article without removal of said seal and to record the date of removal of said seal comprising a band adapted to encircle a portion of the article and to have its ends sealed together, said band having a longitudinal cut dividing it into two portions, and a series of indicia arranged on each of said portions, whereby the date of removal of the seal is recorded by severing each of said portions at a predetermined point.

6. A seal to prevent use of an article without removal of said seal and to record the date of removal of said seal comprising means adapted to encircle a portion of the article and to be sealed, said means having two portions adapted to maintain said means in position about said article independently of each other, and a series of indicia arranged on each of said portions, whereby the date of removal of the seal is recorded by severing each of said portions at a predetermined point.

LEROY J. THOMPSON.